US007990586B2

(12) United States Patent
Nakamura

(10) Patent No.: US 7,990,586 B2
(45) Date of Patent: Aug. 2, 2011

(54) IMAGE FORMING APPARATUS FOR PRODUCING BOOKLET

(75) Inventor: Shoichi Nakamura, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1302 days.

(21) Appl. No.: 11/586,686

(22) Filed: Oct. 26, 2006

(65) Prior Publication Data

US 2007/0171472 A1 Jul. 26, 2007

(30) Foreign Application Priority Data

Jan. 26, 2006 (JP) ................................ 2006-017340

(51) Int. Cl.
*H04N 1/46* (2006.01)

(52) U.S. Cl. ........ 358/505; 358/1.1; 358/1.18; 101/404; 399/362; 270/58.07

(58) Field of Classification Search ................. 358/1.18, 358/1.1; 101/404; 399/362; 270/58.07
See application file for complete search history.

(56) References Cited

U.S. PATENT DOCUMENTS

| | | | | |
|---|---|---|---|---|
| 6,041,165 | A * | 3/2000 | Morikawa | 358/1.2 |
| 6,573,974 | B1 * | 6/2003 | Ikeda et al. | 355/25 |
| 6,633,404 | B1 * | 10/2003 | Atsumi | 358/1.16 |
| 6,987,582 | B1 * | 1/2006 | Atsumi | 358/1.6 |
| 7,263,328 | B2 * | 8/2007 | Asai et al. | 399/408 |
| 7,456,981 | B2 * | 11/2008 | Kuboki | 358/1.13 |
| 7,791,755 | B2 * | 9/2010 | Mori | 358/1.18 |
| 2001/0024578 | A1 * | 9/2001 | Fujii et al. | 399/17 |
| 2004/0169902 | A1 * | 9/2004 | Yaguchi | 358/524 |
| 2005/0179925 | A1 * | 8/2005 | Asami | 358/1.13 |
| 2007/0171472 | A1 * | 7/2007 | Nakamura | 358/1.18 |
| 2008/0049247 | A1 * | 2/2008 | Asai et al. | 358/1.15 |

* cited by examiner

*Primary Examiner* — David K Moore
*Assistant Examiner* — Benjamin O Dulaney
(74) *Attorney, Agent, or Firm* — Finnegan, Henderson, Farabow, Garrett & Dunner, L.L.P.

(57) ABSTRACT

There is described an image forming apparatus, which makes it possible to realize a high productivity in the booklet outputting operation. The apparatus comprises: an image data acquiring section to acquire consecutive image data, which include main content image data and at least a part of cover sheet image data succeeding the main-content sheet image data; an image forming section to conduct an image forming operation based on the main content image data and the cover sheet image data, acquired by the image data acquiring section; an image data presence-or-absence detecting section to detect a presence or absence of (i+1)th image data acquired by the image data acquiring section, wherein "i" represents a page number of image data sets necessary for forming cover sheet images on a cover sheet; and a control section to control the image forming section so as to commence the image forming operation.

11 Claims, 4 Drawing Sheets

IMAGE FORMING APPARATUS FOR PRODUCING BOOKLET

This application is based on Japanese Patent Application No. 2006-017340 filed on Jan. 26, 2006 in Japanese Patent Office, the entire content of which is hereby incorporated by reference.

BACKGROUND OF THE INVENTION

The present invention relates to an image forming apparatus for producing booklet.

There has been well known a case binding apparatus that forms a booklet by covering a bunch of recording papers to be contents of the booklet (hereinafter, the term of the abovementioned “recording papers” is referred to as “main content sheets”) with a cover sheet, on which a front cover image and a back cover image are formed (further, a lining cover image would be also formed as needed), in such a manner that the main content sheets are enveloped by the cover sheet while one side, upper and lower sides of the bunch of the main content sheets are made to be open. In addition, there has been also well known an image forming apparatus that forms images onto the main content sheets and the cover sheet to be supplied to the case binding apparatus (for instance, refer to Tokkai 2002-361967 Japanese Non-Examined Patent Publication).

In the image forming apparatus, set forth in Patent Document 1 (Tokkai 2002-361967 Japanese Non-Examined Patent Publication), the cover sheet image data and the main-content sheet image data are inputted from the external apparatus, and the cover sheet image data are handled independent of the main-content sheet image data. The image forming apparatus forms the cover sheet image based on the cover sheet image data inputted from the external apparatus.

According to the image forming apparatus set forth in Patent Document 1, since the cover sheet image data and the main-content sheet image data are respectively inputted as independent data, the image forming apparatus can recognize whether the inputted image data are the cover sheet image data or the main-content sheet image data. Accordingly, the image forming apparatus can feed the appropriate paper sheet corresponding to the inputted image data, to form the image on it.

However, in order to input the cover sheet image data independent of the main-content sheet image data or vice versa, it is necessary to form the cover sheet image data and the main-content sheet image data being independent of each other. This requires a lot of time and effort.

To overcome the abovementioned drawback, it has been desired to provide an image forming apparatus, which makes it possible to acquire the cover sheet image data and the main-content sheet image data as consecutive image data.

When the cover sheet image data and the main-content sheet image data are acquired as the consecutive image data, and specifically when at least a part of the cover sheet image data is acquired as consecutive image data succeeding the main-content sheet image data, it is impossible to recognize which page is either the cover sheet image data or the main-content sheet image data, unless the acquiring operation of the whole consecutive image data is completed. Accordingly, in order to respectively form the images represented by the both image data onto the appropriate paper sheets, it is necessary to commence the image forming operation and/or the paper feeding operation after the acquiring operation of the whole consecutive image data is completed. This results in deterioration of the productivity of the booklets.

SUMMARY OF THE INVENTION

To overcome the abovementioned problems in the conventional image forming apparatus, it is an object of the present invention to provide an image forming apparatus, which makes it possible to realize a high productivity in the booklet outputting operation, when consecutive image data, which include main content image data and at least a part of cover sheet image data succeeding the main-content sheet image data, are inputted into the apparatus.

Accordingly, to overcome the abovementioned shortcomings, the object of the present invention can be attained by the image forming apparatus described as follow.

(1) An image forming apparatus, comprising: an image data acquiring section to acquire consecutive image data, which include main content image data and at least a part of cover sheet image data succeeding the main-content sheet image data; an image forming section to conduct an image forming operation based on the main content image data and the cover sheet image data, acquired by the image data acquiring section; an image data presence-or-absence detecting section to detect a presence or absence of (i+1)th image data acquired by the image data acquiring section, wherein “i” represents a page number of image data sets necessary for forming cover sheet images on a cover sheet, and -th is replaced by corresponding one of -st, -nd, -rd, when a calculated value in the parentheses is equal to any one of 1, 2, 3; and a control section to control the image forming section so as to commence the image forming operation.

(2) An image forming apparatus, comprising: an image data acquiring section to acquire consecutive image data, which include main content image data and at least a part of cover sheet image data succeeding the main-content sheet image data; an image forming section to conduct an image forming operation based on the main content image data and the cover sheet image data, acquired by the image data acquiring section; an image data presence-or-absence detecting section to detect a presence or absence of i-th image data acquired by the image data acquiring section, wherein “i” represents a page number of image data sets necessary for forming cover sheet images on a cover sheet, and -th is replaced by corresponding one of -st, -nd, -rd, when a value of “i” is equal to any one of 1, 2, 3; and a control section to control the image forming section so as to commence the image forming operation.

(3) An image forming apparatus, comprising: an image data acquiring section to acquire consecutive image data, which include main content image data and at least a part of cover sheet image data succeeding the main-content sheet image data; an image forming section to conduct an image forming operation based on the main content image data and the cover sheet image data, acquired by the image data acquiring section; a control section to control the image forming section so as to commence the image forming operation, when a page number of image data sets currently acquired by the image data acquiring section exceeds a predetermined page number of image data sets necessary for forming cover sheet images on a cover sheet.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Configuration of Apparatus

Figure 1:
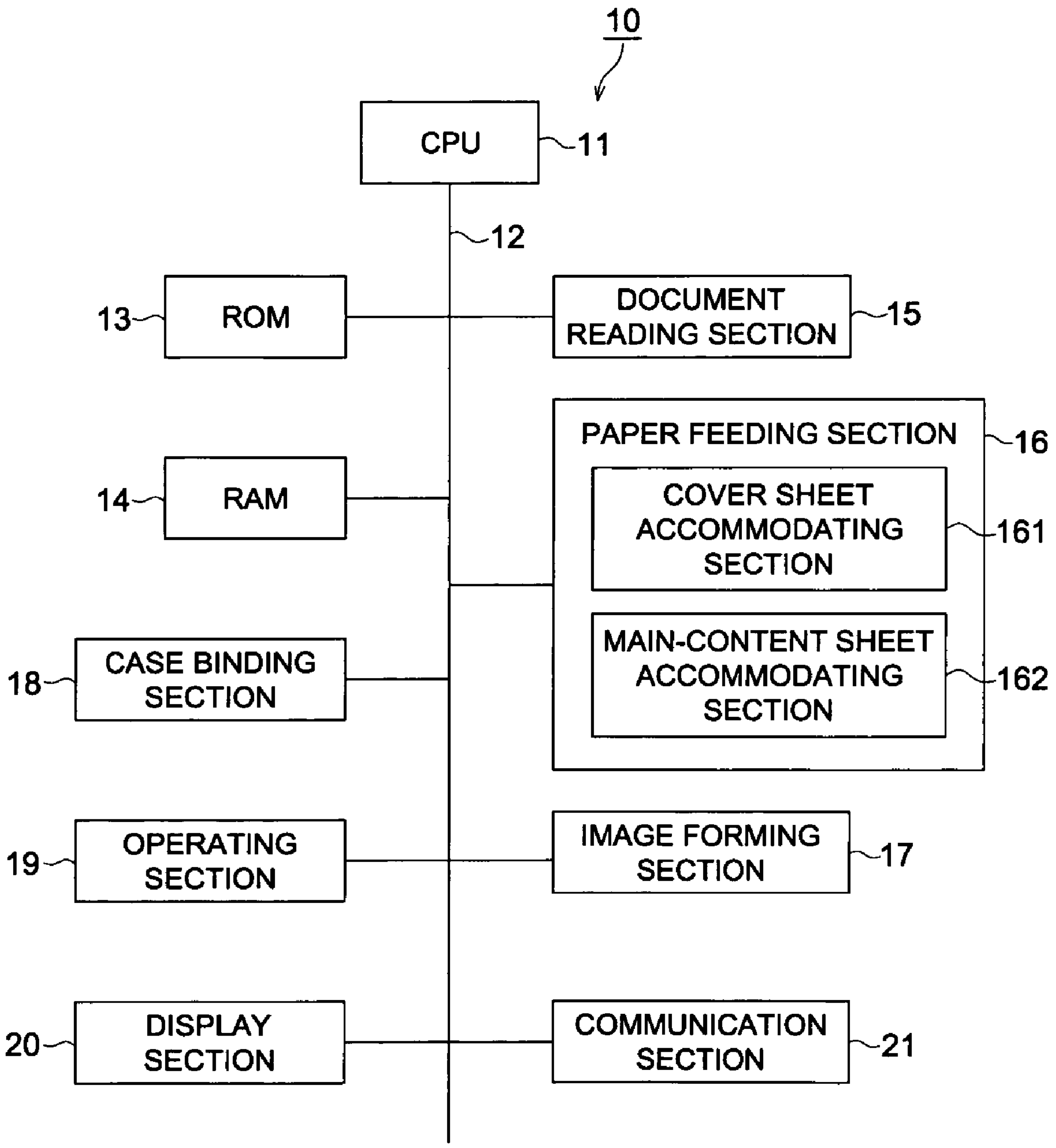
FIG. 1 shows a block diagram of an image forming system embodied in the present invention.

FIG. 1 shows a block diagram of the image forming system embodied in the present invention.

The image forming apparatus 10 is provided with a CPU (Central Processing Unit) 11 for executing various kinds of controlling operations according to programs, a ROM (Read Only Memory) 13, a RAM (Random Access Memory) 14, a document reading section 15, a paper feeding section 16, an image forming section 17, an case binding section 18, an operating section 19, a display section 20 and a communication section 21, which are coupled to each other through a bus 12.

The ROM 13 stores various kinds of the programs and the data based on which the CPU 11 implements the operations for controlling the image forming apparatus 10. In this embodiment, the ROM 13 stores a number of image data sets necessary for the cover sheet in each mode of various case binding modes, detailed later.

The CPU 11 utilizes the RAM 14 as a working area in which the programs and the data necessary for implementing the controlling operations are temporarily stored.

The document reading section 15 reads document images in order to generate image data of them. The generated image data are outputted to the image forming section 17.

The paper feeding section 16 includes a cover sheet accommodating section 161 for accommodating the cover sheets and a main-content sheet accommodating section 162 for accommodating the main content sheets, and feeds a cover sheet or a main content sheet into the image forming section 17.

The image forming section 17 forms images onto the cover sheet or the main content sheets, based on the image data inputted from the document reading section 15.

The case binding section 18 receives the cover sheet and the main content sheets conveyed from the image forming section 17, to conduct a case binding operation.

The operating section 19 is operated by the user so as to input the setting of a case binding mode, a print commencement instruction, etc.

The display section 20 displays various kinds of setting screens, etc. Further, it is also applicable that the touch panel is equipped on the display screen of the display section 20 so as to simultaneously serve as the operating section 19.

The communication section 21 serves as an interface for communicating with the external devices to receive the image data transmitted from the personal computer, etc.

<Summary of Controlling Operation>

Figure 2:
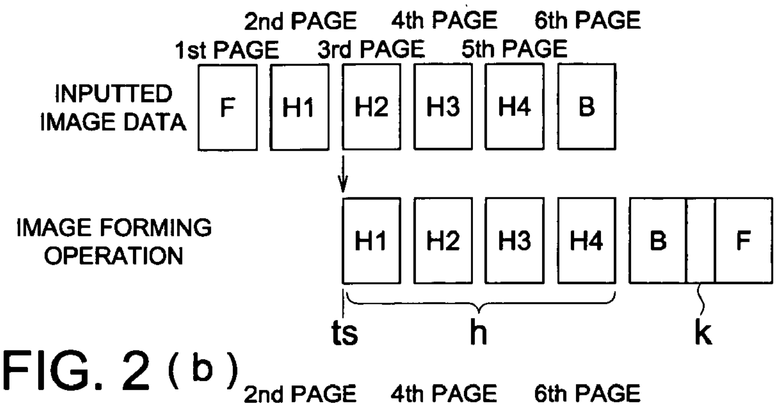
FIG. 2(*a*), FIG. 2(*b*), FIG. 2(*c*) and FIG. 2(*d*) show exemplified schematic diagrams indicating relationships between input timings of input image data and timings of commencing image forming operations.
Figure 2:
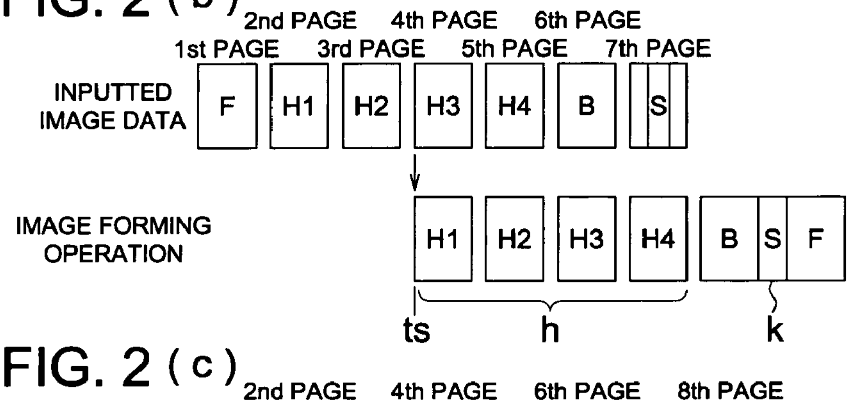
Figure 2:
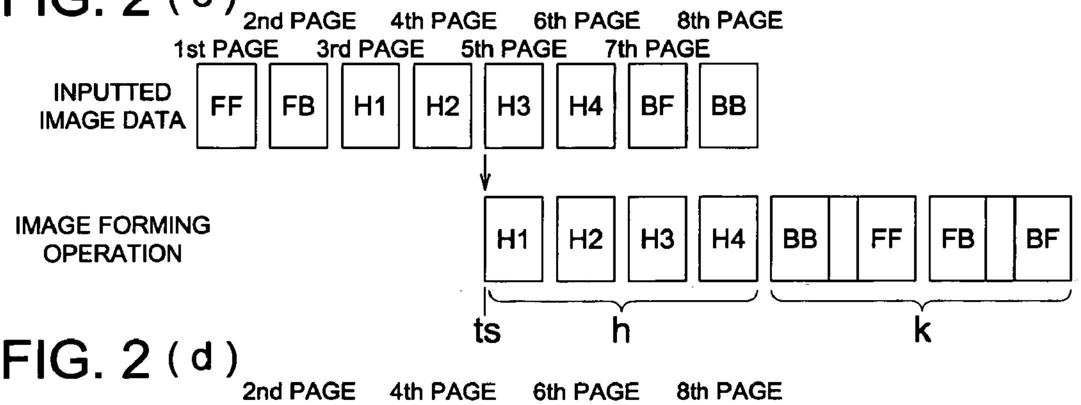
Figure 2:
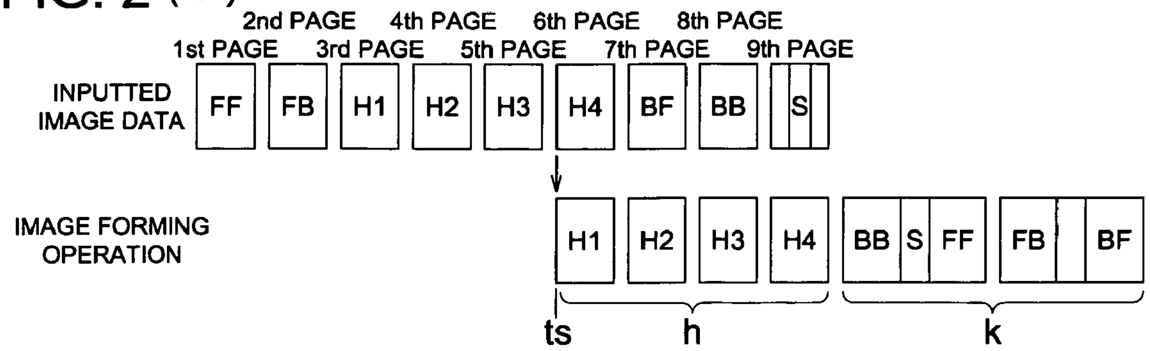

FIGS. 2(*a*) through 2(*b*) show conceptual illustrations, each indicating a relationship between an input timing of the input image data and a commencement timing of the image forming operation, embodied in the present invention. Further, exemplified in each of FIGS. 2(*a*) through 2(*b*) indicates a case in which the input image data are inputted in order of the front cover image data, the main content image data, the rear cover image data and the lining cover image data. In addition, it is premised that image data for the cover sheet must exist in the input image data.

FIG. 2(*a*) indicates a cover sheet one-side printing mode in which the lining cover image is not formed, and a case in which the input image data for six pages are included, as an example. As shown in FIG. 2(*a*), Page 1, Pages 2-5 and Page 6 correspond to front cover image data F, main content image data H1-H4 and rear cover image data B, respectively.

A commencement timing ts of the image-forming operation is set at a timing when detecting a presence or absence of the main content image data H2 for Page 3. As the detecting method, it is applicable that the presence or absence of the image data concerned is directly detected, or the presence-or-absence detecting sensor (not shown in the drawings) mounted on the document stacking tray detects the presence or absence of the image data if the documents are printed on the paper sheets.

The reason why the commencement timing ts is set at the timing when detecting a presence or absence of the main content image data H2 for Page 3 will be detailed in the following.

At the time when the image data for Page 1 are inputted, it is impossible to commence the image-forming operation. This is because, the image data for Page 1 are the front cover image data F, which should be combined with the rear cover image data B of Page 6, being a final Page, so as to form cover sheet images on the cover sheet. Since the rear cover image data B of Page 6 have not been inputted at this time, it is impossible to commence the image-forming operation.

Even at the time when the existence of the image data for Page 2 is detected, it is still impossible to commence the image-forming operation. This is because, it is still impossible to determine whether the image data for Page 2 are the final image data (rear cover image data B) or the main content image data H1.

At the time when detecting the presence or absence of the main content image data H2 for Page 3, in the case that the presence of the image data for Page 3 is detected, it is possible to recognize that the image data for Page 2 are not the final image data (rear cover image data B). Accordingly, since it can be confirmed that the image data for Page 2 are the main content image data H1, it becomes possible to form the main content image, based on the main content image data H1, on a main content sheet h. As a result, the image forming operation can be commenced.

After commencing the image-forming operation based on the main content image data H1, each of the main content images based on the main content image data H2-H4 are successively formed on main content sheet h at timings indicated in the drawing, and finally, the front cover image and the rear cover image, based on the front cover image data F and the rear cover image data B, are formed on a cover sheet k.

If the absence of the image data of Page 3 is detected at the time when detecting the presence or absence of the image data of Page 3, the image data of Page 2 can be recognized as the final image data (rear cover image data B). Accordingly, since it can be confirmed that the image data for Page 2 are the rear cover image-data B, it becomes possible to form the front cover image and the rear cover image, based on the front cover image data F and the rear cover image data B, on the cover sheet k. As a result, the image forming operation can be commenced.

In other words, it is possible to commence the image-forming operation at the timing when detecting the presence or absence of the image data of Page 3, which is derived by adding 1 to 2 being a number of image data sets (front cover image data F and rear cover image data B) necessary for forming the cover sheet images.

FIG. 2(*b*) indicates a cover sheet one-side printing mode in which the lining cover image is also formed, and a case in which the input image data for seven pages are included, as an example. As shown in FIG. 2(*b*), Page 1, Pages 2-5, Page 6 and Page 7 correspond to the front cover image data F, the main content image data H1-H4, the rear cover image data B and lining cover image data S, respectively.

A commencement timing ts of the image-forming operation is set at a timing when detecting a presence or absence of the main content image data H3 for Page 4. The case, shown in FIG. 2(*b*), can be understood in the similar way as mentioned in the case shown in FIG. 2(*a*). In this case, it is possible to commence the image-forming operation at the time when detecting the presence or absence of the image data of Page 4, which is derived by adding 1 to 3 being a number of image data sets (front cover image data F, rear cover image data B and lining cover image data S) necessary for forming the cover sheet images.

FIG. 2(*c*) indicates a cover sheet both-side printing mode in which the lining cover image is not formed, and a case in which the input image data for eight pages are included, as an example. As shown in FIG. 2(*c*), Page 1, Page 2, Pages 3-6, Page 7 and Page 8 correspond to front cover image data FF, front cover image data FB, the main content image data H1-H4, rear cover image data BF and rear cover image data BB, respectively.

A commencement timing ts of the image-forming operation is set at a timing when detecting a presence or absence of the main content image data H3 for Page 5. The case, shown in FIG. 2(*c*), can be understood in the similar way as mentioned in the case shown in FIG. 2(*a*). In this case, it is possible to commence the image-forming operation at the time when detecting the presence or absence of the image data of Page 5, which is derived by adding 1 to 4 being a number of image data sets (front cover image data FF, front cover image data FB, rear cover image data BF and rear cover image data BB) necessary for forming the cover sheet images.

FIG. 2(*d*) indicates a cover sheet both-side printing mode in which the lining cover image is also formed, and a case in which the input image data for nine pages are included, as an example. As shown in FIG. 2(*d*), Page 1, Page 2, Pages 3-6, Page 7, Page 8 and Page 9 correspond to the front cover image data FF, the front cover image data FB, the main content image data H1-H4, the rear cover image data BF, the rear cover image data BB and the lining cover image data S, respectively.

A commencement timing ts of the image-forming operation is set at a timing when detecting a presence or absence of the main content image data H4 for Page 6. The case, shown in FIG. 2(*d*), can be understood in the similar way as mentioned in the case shown in FIG. 2(*a*). In this case, it is possible to commence the image-forming operation at the time when detecting the presence or absence of the image data of Page 6, which is derived by adding 1 to 5 being a number of image data sets (front cover image data FF, front cover image data FB, rear cover image data BF, rear cover image data BB and lining cover image data S) necessary for forming the cover sheet images.

Generally speaking, it is possible to commence the image-forming operation at the time when detecting the presence or absence of the image data of Page (i+1), which is derived by adding 1 to i, being a number of image data sets necessary for forming the cover sheet images, as mentioned in the above. This makes it possible to improve the productivity of the image forming apparatus up to a higher level, compared to the conventional method in which the image forming operation is commenced just after the reading operation of the final image data is completed.

Although the input image data are inputted in order of the front cover image data, the main content image data, the rear cover image data and the lining cover image data in the examples shown in FIGS. 2(*a*) through 2(*d*), it is applicable as the input image data that at least one of the image data sets, necessary for forming the cover sheet images, is arranged after the main content image data. If this kind of input order arrangement is applied, it is possible to commence the image-forming operation at the time when detecting the presence or absence of the image data of Page (i+1), which is derived by adding 1 to i, being a number of image data sets necessary for forming the cover sheet images, resulting in the improvement of the productivity of the image forming apparatus, as well as the cases described referring to FIGS. 2(*a*) through 2(*d*).

Figure 3:
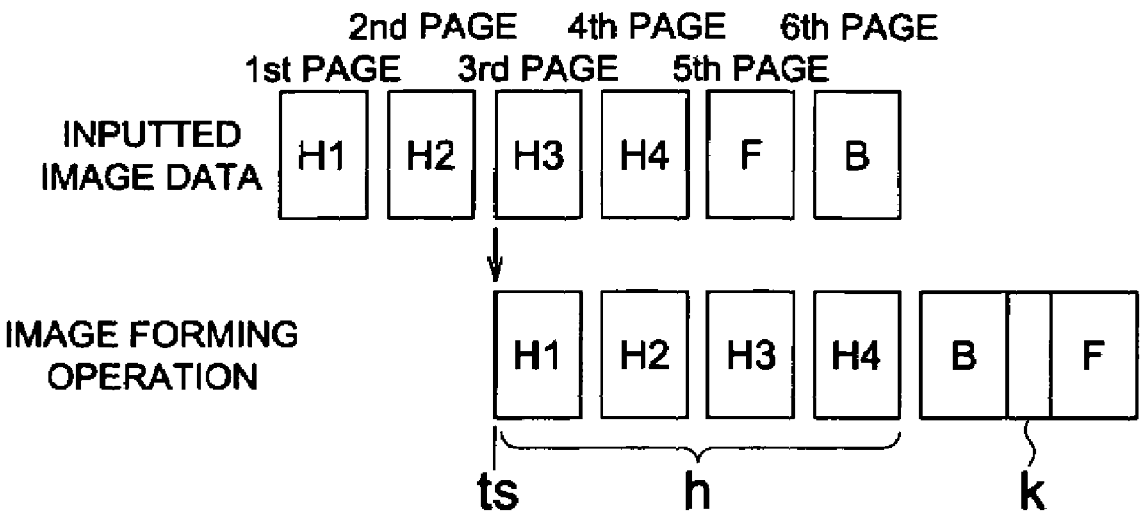
FIG. 3(*a*) and FIG. 3(*b*) show other exemplified schematic diagrams indicating relationships between input timings of input image data and timings of commencing image forming operations.
Figure 3:
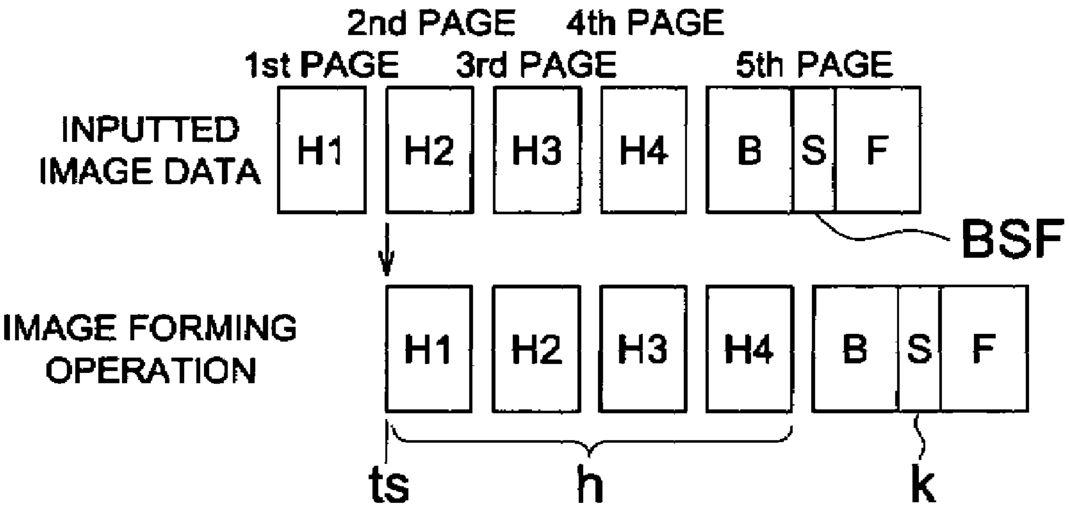

For instance, other examples are shown in FIGS. 3(*a*) and 3(*b*). FIG. 3(*a*) shows an example in which the input order of the image data is arranged in order of the main content image data H1-H4, the front cover image data F and the rear cover image data B in the example shown in FIG. 2(*a*).

In this example, a commencement timing ts of the image-forming operation is set at a timing when detecting a presence or absence of the main content image data H3 for Page 3, as well as in the example shown in FIG. 2(*a*).

At the time when the image data for Page 1 are inputted, it is impossible to commence the image-forming operation. This is because, it is impossible to determine whether the image data for Page 1 are the main content image data H1 or the front cover image data F. Further, if the main content image data do not exist, the image data for Page 1 should be the front cover image data F.

Even at the time when the existence of the image data for Page 2 is detected, it is still impossible to commence the image-forming operation. This is because, it is still impossible to determine whether the image data for Page 1 are the main content image data H1 or the front cover image data F. Further, if the image data for Page 2 are the main content image data H2 or the front cover image data F, the image data for Page 1 should be the main content image data H1. Otherwise, if the image data for Page 2 are the rear cover image data B, the image data for Page 1 should be the front cover image data F.

At the time when detecting the presence or absence of the main content image data H3 for Page 3, in the case that the presence of the image data for Page 3 is detected, the image data for Page 1 can be determined as the main content image data H1. This is because, the image data for Page 1 cannot be the front cover image data F or the rear cover image data B. Accordingly, it becomes possible to form the main content image, based on the main content image data H1, on the main content sheet h. As a result, the image forming operation can be commenced.

After commencing the image-forming operation based on the main content image data H1, each of the main content images based on the main content image data H2-H4 are successively formed on main content sheet h at timings-indicated in the drawing, and finally, the front cover image and the rear cover image, based on the front cover image data F and the rear cover image data B, are formed on the cover sheet k.

If the absence of the image data of Page 3 is detected at the time when detecting the presence or absence of the image data of Page 3, the image data of Page 2 can be recognized as the final image data (rear cover image data B). Accordingly, since it can be confirmed that the image data for Page 2 are the rear cover image data B, it becomes possible to form the front cover image and the rear cover image, based on the front cover image data F and the rear cover image data B, on the cover sheet k. As a result, the image forming operation can be commenced.

In other words, it is possible to commence the image-forming operation at the timing when detecting the presence or absence of the image data of Page 3, which is derived by adding 1 to 2 being a number of image data sets (front cover image data F and rear cover image data B) necessary for forming the cover sheet images.

Next, an example in which cover sheet image data BSF formed by combining the front cover image data F, the rear cover image data B and the lining cover image data S are inputted into the apparatus in succession to the main content image data H1-H4, is indicated in FIG. 3(*b*).

In this example, a commencement timing ts of the image-forming operation is set at a timing when detecting a presence or absence of the main content image data H2 for Page 2.

At the time when the image data for Page 1 are inputted, it is impossible to commence the image-forming operation. This is because, it is impossible to determine whether the image data for Page 1 are the main content image data H1 or the cover sheet image data BSF combined. Further, if the main content image data do not exist, the image data for Page 1 should be the cover sheet image data BSF combined.

At the time when detecting the presence or absence of the main content image data H2 for Page 2, in the case that the presence of the image data for Page 2 is detected, the image data for Page 1 can be determined as the main content image data H1. This is because, the image data for Page 1 cannot be the cover sheet image data BSF combined. Accordingly, it becomes possible to form the main content image, based on the main content image data H1, on the main content sheet h. As a result, the image forming operation can be commenced.

After commencing the image-forming operation based on the main content image data H1, each of the main content images based on the main content image data H2-H4 are successively formed on main content sheet h at timings indicated in the drawing, and finally, the cover sheet images, based on the cover sheet image data BSF combined, are formed on the cover sheet k.

If the absence of the image data of Page 2 is detected at the time when detecting the presence or absence of the image data of Page 2, the image data for Page 1 can be determined as the cover sheet image data BSF combined. Accordingly, it becomes possible to form the cover sheet images, based on the cover sheet image data BSF combined, on the cover sheet k. As a result, the image forming operation can be commenced.

In other words, it is possible to commence the image-forming operation at the timing when detecting the presence or absence of the image data of Page 2, which is derived by adding 1 to 1 being a number of image data sets (cover sheet image data BSF combined) necessary for forming the cover sheet images.

<Flow of Image Forming Processing>

Figure 4:
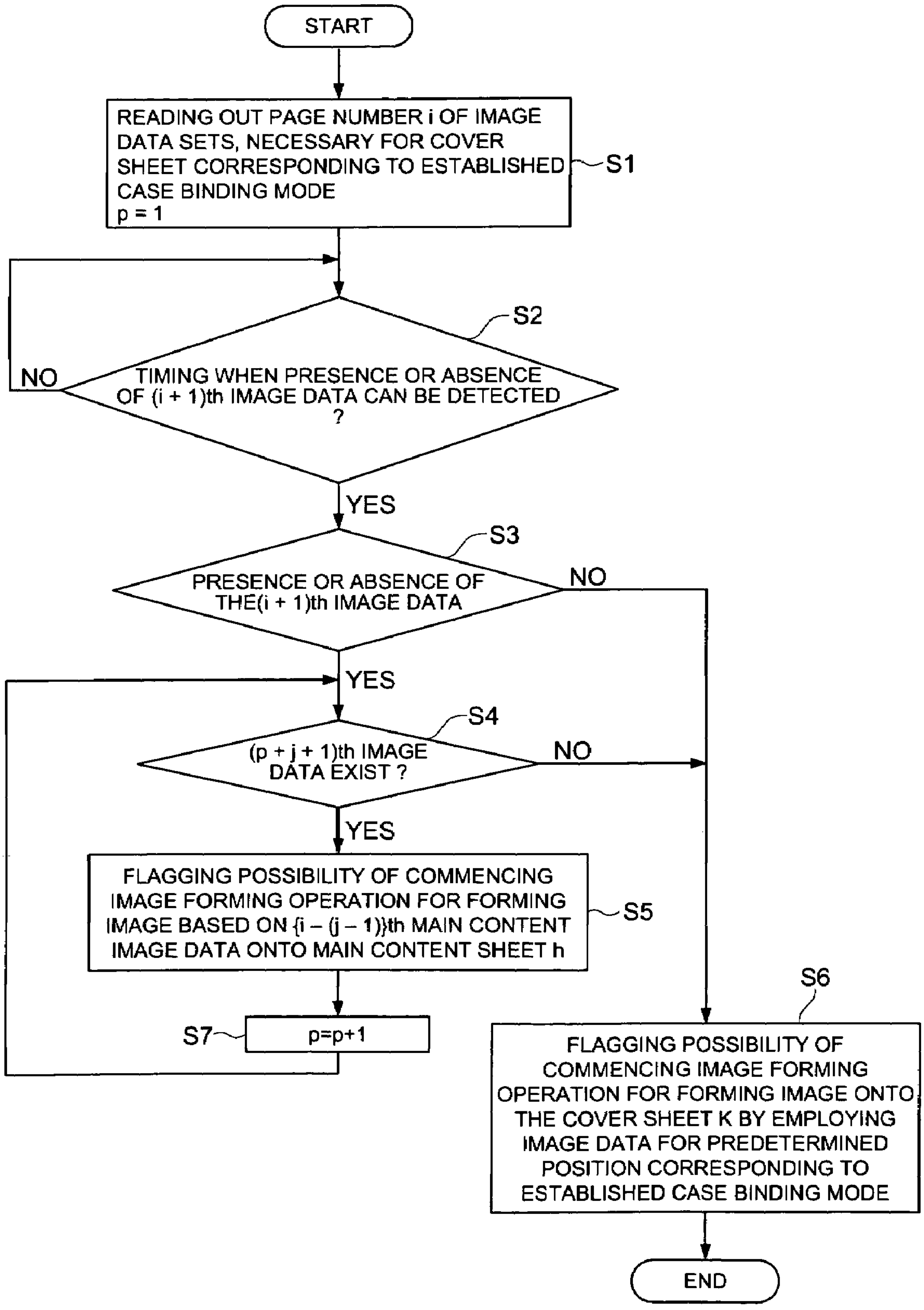
FIG. 4 shows a flowchart of image forming processing embodied in the present invention.

FIG. 4 shows a flowchart of the image forming processing embodied in the present invention. However, the scope of the present invention is not limited to the exemplified flowchart shown in FIG. 4. The CPU 11 implements the image forming processing by executing the programs stored in the ROM 13. It is assumed that a certain specific case binding mode has been established and the commencement of image forming operation has been instructed from the operating section 19, and accordingly, the document reading section 15 already commences the reading operation of the original document.

Initially, the CPU 11 reads out page number i of image data sets, necessary for the cover sheet corresponding to the case binding mode established by the operating section 19, and page number j of image data sets, to be acquired after the main content image data, from the ROM 13 (Step S1). For instance, as for the cover sheet one-side printing mode in which the lining cover image is not formed, as shown in FIG. 2(*a*), the ROM 13 stores i=2 and j=1, as page number i of image data sets necessary for the cover sheet, and page number j of image data sets to be acquired after the main content image data, respectively. Incidentally, when value i is equal to value j, the value j could be omitted.

Further, the CPU 11 resets a counter provided in the RAM 14 for counting page number p of image data sets based on which image-forming operations are completed.

Next, the CPU 11 determines whether or not the image forming operation reaches to a timing when the presence or absence of the (i+1)th (hereinafter, -th is replaced by corresponding one of -st, -nd, -rd, when a calculated value in the parentheses is equal to any one of 1, 2, 3) image data can be detected, while confirming the image data inputted from the document reading section 15 (Step S2). For instance, if the (i+1)th image data exist, a timing when the existence of the (i+1)th image data is detected, can be regarded as the timing when the presence or absence of the (i+1)th image data can be detected. When determining that the image forming operation reaches to the timing when the presence or absence of the (i+1)th image data can be detected (Step S2; Yes), the CPU 11 detects the presence or absence of the (i+1)th image data (Step S3). When determining that the image forming operation does not reach to the timing (Step S2; No), the CPU 11 waits in a standby state until the image forming operation reaches to the timing the presence or absence of the (i+1)th image data can be detected.

Successively, when determining that the (i+1)th image data exist in Step S3 (Step S3; Yes), the CPU 11 detects whether or not the (p+j+1)th image data exist (Step S4). When determining that the (p+j+1)th image data exist (Step S4; Yes), the CPU 11 flags the possibility of commencing the image forming operation for forming the image based on the {i−(j−1)}th main content image data onto the main content sheet h (Step S5). For instance, in the case shown in FIG. 2(*a*), since i=2 and j=1, {i−(j−1)}=2. Accordingly, it becomes possible to commence the image forming operation for forming the image based on the main content image data H1, being the 2nd image data, onto the main content sheet h.

Based on the flag for enabling the commencement of the image forming operation for forming the image represented by the {i−(j−1)}th image data onto the main content sheet h, if the preparations are met, the CPU 11 conducts controlling operations so as to feed the main content sheet h accommodated in the main-content sheet accommodating section 162 of the paper feeding section 16, and then, controls the image forming section 17 so as to form the image based on the {i−(j−1)}th image data onto the main content sheet h fed into the image forming section 17.

When determining that the (i+1)th image data do not exist in Step S3 (Step S3; No), or determining that the (p+i+1)th image data do not exist in Step S4 (Step S4; No), the CPU 11 flags the possibility of commencing the image forming operation for forming the image onto the cover sheet k by employing the image data for the predetermined position corresponding to the selected case binding mode (Step S6), and then finalizes the flow. For instance, in the case shown in FIG. 2(*a*), it becomes possible to commence the image forming operation for forming the image onto the cover sheet k by employing the initial image data located at the first position and the final image data located at the sixth position. The image data located at the predetermined position corresponding to the case binding mode are stored in the ROM 13, while correlating with the case binding mode.

Based on the flag for enabling the commencement of the image forming operation for forming the image onto the cover sheet k by employing the image data for the predetermined position corresponding to the established case binding mode, if the preparations are met, the CPU 11 conducts controlling operations so as to feed the cover sheet k accommodated in the cover sheet accommodating section 161 of the paper feeding section 16, and then, controls the image forming section 17 so as to form the image based on the image data of the predetermined position corresponding to the established case binding mode onto the cover sheet k fed into the image forming section 17.

The CPU 11 adds 1 to p in Step S7, and then, return to Step S4, so as to repeat the operation in Step S5 until the (p+j+1)th image data do not exist (Step S4; No). Accordingly, in the case shown in FIG. 2(*a*) for instance, it becomes possible to commence the image-forming operation for forming the image based on each of the main content image data H2-H4 onto the main content sheet h.

In the present embodiment, the commencement of the image forming operation becomes possible under the condition that the presence or absence of the (i+1)th image data can be detected. It is also applicable, however, that the commencement of the image forming operation becomes possible under the condition that it can be detected whether or not the i-th image data are the final image data. For instance, this can be applied by adding the information indicating the "final" to the final image data. Further, it is also applicable that the commencement of the image forming operation becomes possible under the condition that a number of image data sets currently acquired by the image data acquiring section exceeds number i of cover-sheet image data sets necessary for forming the images on the cover sheet.

When the number of image data sets is smaller than number i of cover-sheet image data sets necessary for forming the images on the cover sheet, for instance, it is preferable that a certain warning message is displayed on the display section 20, instead of commencing the image forming operation.

Although the image data are inputted from the document reading section 15 in the present embodiment, it is also applicable that the image data are inputted from an external device, such as a personal computer, etc., through the communication section 21.

Although the case binding section 18 is internally equipped inside the image forming apparatus 10 in the present embodiment, it is also applicable that, instead of the case binding section 18, a case binding apparatus equipped outside the image forming apparatus 10 is coupled to the image forming apparatus 10.

According to the present invention, even when acquiring the consecutive image data, which include the main content image data and at least a part of the cover sheet image-data succeeding the main-content sheet image data, it becomes possible to commence the image-forming operation without waiting the completion of reading the final image data, resulting in an improvement of the productivity in the production of booklets higher than ever.

While the preferred embodiments of the present invention have been described using specific term, such description is for illustrative purpose only, and it is to be understood that changes and variations may be made without departing from the spirit and scope of the appended claims.

What is claimed is:

1. An image forming apparatus that forms images onto a cover sheet to be used for a case binding and at least a main content sheet, comprising:

an image data acquiring component that is configured to acquire consecutive image data, which include main content image data and at least a part of cover sheet image data succeeding the main content image data;

an image forming component that is configured to conduct an image forming operation based on the main content image data and the cover sheet image data, acquired by the image data acquiring component, so as to form the images onto the cover sheet and at least the main content sheet;

an operating component that is configured to establish a page number of image data sets to be included in the cover sheet image data, wherein the page number of image data sets is represented by integer "i";

an image data presence-or-absence detecting component that is configured to detect a presence or absence of (i+1)th image data acquired by the image data acquiring component, wherein -th is replaced by corresponding one of -st, -nd, -rd, when a calculated value in the parentheses is equal to any one of 1, 2, 3; and a control component that is configured to control the image forming component so as to commence the image forming operation at a time during a period after the image data presence-or-absence detecting component has detected the presence of (i+1)th image data, acquired by the image data acquiring component, and before the image data acquiring component completes an operation for acquiring the consecutive image data.

2. The image forming apparatus of claim 1, further comprising:

a storage component that is configured to store the page number of image data sets necessary for forming the cover sheet images on the cover sheet.

3. The image forming apparatus of claim 1, further comprising:

a paper feeding component that is configured to feed the cover sheet, on which the cover sheet images based on the cover-sheet image data are formed, and a main content sheet, on which each page of main-content sheet images based on the main content image data is formed;

wherein, when the image data presence-or-absence detecting component detects a presence of the (i+1)th image data, the control component controls the paper feeding component so as to feed the main content sheet to the image forming component and controls the image forming component so as to form an image based on {i−(j−1)}th image data; and wherein "j" represents a page number of image data sets, which are acquired by the image data acquiring component and succeed the main content image data.

4. The image forming apparatus of claim 3, further comprising:

a counting component that is configured to count a page number of image data sets based on which the image forming component already completes the image forming operation;

wherein "p" represents the page number of image data sets, and when the image data presence-or-absence detecting component detects a absence of (p+j+1)th image data, the control component controls the paper feeding component so as to feed the cover sheet to the image forming component and controls the image forming component so as to form the cover sheet images based on the cover sheet image data on the cover sheet.

5. The image forming apparatus of claim 1, further comprising:

a paper feeding component that is configured to feed the cover sheet, on which the cover sheet images based on the cover-sheet image data are formed, and a main content sheet, on which each page of main-content sheet images based on the main content image data is formed;

wherein, when the image data presence-or-absence detecting component detects an absence of the (i+1)th image data, the control component controls the paper feeding component so as to feed the cover sheet to the image forming component and controls the image forming component so as to form the cover sheet images based on the cover sheet image data onto the cover sheet.

6. The image forming apparatus of claim 1, wherein the cover sheet image data, acquired by the image data acquiring component, includes front cover image data and rear cover image data.

7. The image forming apparatus of claim 6, wherein the image data acquiring component acquires the consecutive image data in order of the front cover image data, the main content image data and the rear cover image data.

8. A non-transitory computer-readable medium containing computer-readable instructions for performing a method comprising:

acquiring consecutive image data, which include main content image data and at least a part of cover sheet image data succeeding the main content image data;

conducting an image forming operation based on the main content image data and the cover sheet image data, so as to form the images onto the cover sheet and at least a main content sheet;

establishing a page number of image data sets to be included in the cover sheet image data; and controlling the image forming operation so as to commence the image forming operation, based on the fact that the page number of image data sets currently acquired exceeds a predetermined page number of image data sets necessary for forming cover sheet images on a cover sheet, before completion of acquiring the consecutive image data.

9. The non-transitory computer-readable medium of claim 8, wherein the cover sheet image data includes front cover image data and rear cover image data.

10. The non-transitory computer-readable medium of claim 9, wherein acquiring the consecutive image data comprises acquiring the consecutive image data in order of the front cover image data, the main content image data and the rear cover image data.

11. An image forming apparatus, comprising:

an image data acquiring component that is configured to acquire consecutive image data, which include main content image data and at least a part of cover sheet image data succeeding the main content image data;

an image forming component that is configured to conduct an image forming operation based on the main content image data and the cover sheet image data, acquired by the image data acquiring component;

an image data presence-or-absence detecting component that is configured to detect a presence or absence of (i+1)th image data acquired by the image data acquiring component, wherein "i" represents a page number of image data sets necessary for forming cover sheet images on a cover sheet, and -th is replaced by corresponding one of -st, -nd, -rd, when a calculated value in the parentheses is equal to anyone of 1, 2, 3;

a control component that is configured to control the image forming component so as to commence the image forming operation; and a paper feeding component that is configured to feed the cover sheet, on which the cover sheet images based on the cover-sheet image data are formed, and a main content sheet, on which each page of main-content sheet images based on the main content image data is formed, wherein, when the image data presence-or-absence detecting component detects a presence of the (i+1)th image data, the control component controls the paper feeding component so as to feed the main content sheet to the image forming component and controls the image forming component so as to form an image based on {i−(j−1)}th image data, and wherein "j" represents a page number of image data sets, which are acquired by the image data acquiring component and succeed the main content image data.

* * * * *